(12) United States Patent
Hanatsuka (10) Patent No.: US 8,061,191 B2
(45) Date of Patent: Nov. 22, 2011

(54) METHOD AND APPARATUS FOR DETECTING WEAR OF TIRE

(75) Inventor: Yasushi Hanatsuka, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 129 days.

(21) Appl. No.: 12/668,314

(22) PCT Filed: Jul. 3, 2008

(86) PCT No.: PCT/JP2008/062048
§ 371 (c)(1),
(2), (4) Date: Feb. 4, 2010

(87) PCT Pub. No.: WO2009/008319
PCT Pub. Date: Jan. 15, 2009

(65) Prior Publication Data
US 2010/0199756 A1 Aug. 12, 2010

(30) Foreign Application Priority Data
Jul. 11, 2007 (JP) ................................. 2007-181776

(51) Int. Cl.
*G01M 17/02* (2006.01)
*B60C 11/24* (2006.01)

(52) U.S. Cl. ........................................... 73/146; 702/34

(58) Field of Classification Search ........................ None
See application file for complete search history.

(56) References Cited

U.S. PATENT DOCUMENTS

| 7,138,910 | B2 * | 11/2006 | Ogawa | 340/442 |
| 2005/0085987 | A1 * | 4/2005 | Yokota et al. | 701/80 |
| 2005/0204806 | A1 * | 9/2005 | Brusarosco et al. | 73/146 |
| 2007/0213953 | A1 | 9/2007 | Kitazaki et al. | |
| 2008/0027658 | A1 * | 1/2008 | Ichikawa et al. | 702/34 |
| 2009/0043517 | A1 | 2/2009 | Matsuda et al. | |
| 2009/0120178 | A1 * | 5/2009 | Iwase | 73/146 |
| 2010/0186492 | A1 * | 7/2010 | Morinaga | 73/146 |
| 2011/0118989 | A1 * | 5/2011 | Morinaga | 702/34 |

FOREIGN PATENT DOCUMENTS

| JP | 2005-28950 A | 2/2005 |
| JP | 2006-145366 A | 6/2006 |
| JP | 2007-055284 A | 3/2007 |
| JP | 2007-153034 A | 6/2007 |
| WO | 2007/010895 A1 | 1/2007 |

OTHER PUBLICATIONS

International Search Report for PCT/JP2008/062048, dated Sep. 16, 2008, 4 pages.

* cited by examiner

*Primary Examiner* — Andre Allen
(74) *Attorney, Agent, or Firm* — Sughrue Mion, PLLC (57) ABSTRACT

A method and apparatus for detecting the state of wear of the tire tread with accuracy and durability are provided. Acceleration of the inner surface of the tire tread is detected by an acceleration sensor installed in an inner liner region of the tire. From a thus detected time-series waveform of acceleration, an acceleration waveform in the leading edge region including a leading peak which occurs when the block engages with the road surface or an acceleration waveform in the trailing edge region including a trailing peak which occurs when the block disengages from the road surface is extracted. A frequency band value $P_f$ is calculated which is the magnitude of acceleration in a predetermined frequency region of a frequency spectrum obtained through a frequency analysis of the extracted acceleration waveform. And the degree of tire wear is determined by comparing the frequency band value $P_f$ with a preset threshold $K(v)$.

10 Claims, 8 Drawing Sheets

ion No. PCT/JP2008/062048 filed Jul. 3, 2008, claiming priority based on Japanese Patent Application No. 2007-181776, filed Jul. 11, 2007, the contents of all of which are incorporated herein by reference in their entirety.

TECHNICAL FIELD

The present invention relates to a method for detecting the progress of tire wear and an apparatus therefor.

BACKGROUND ART

Generally tire wear causes significant changes in tire performance, a drop in draining performance on wet road surfaces being among them, depending of the degree of wear. Therefore, it is important to detect the condition of tires coming in contact with the road surface, especially, the degree of wear, if the safety of vehicular operation is to be enhanced. If tire wear further advances, there will be greater risks of tire burst.

Figure 8A:
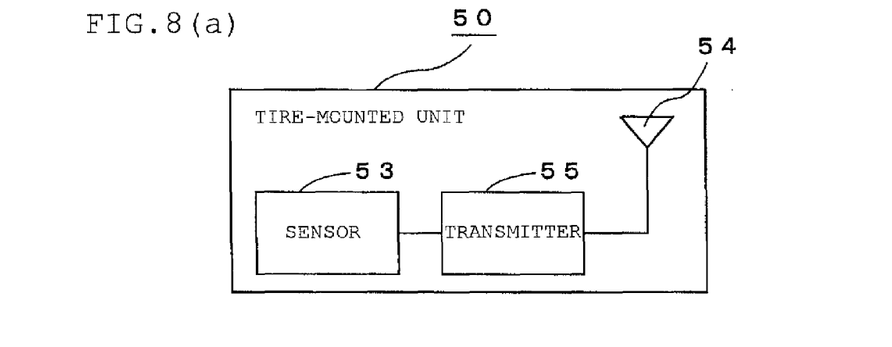
FIG. 8 is illustrations showing a conventional method of estimating the amount of tire wear.
Figure 8B:
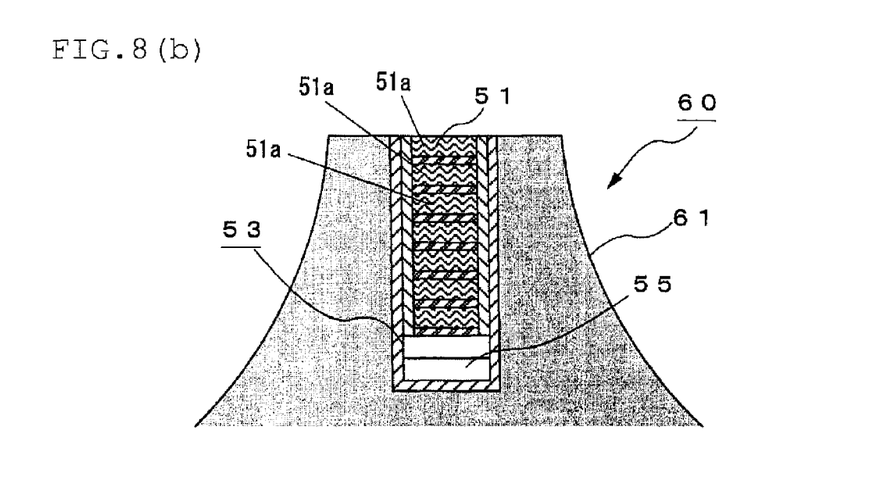
Figure 8C:
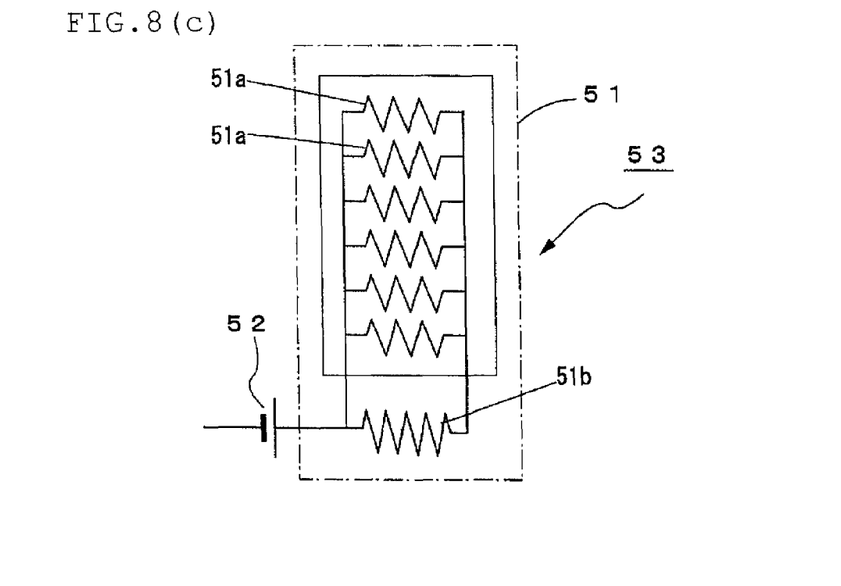

A method for estimating the amount of tire wear, as shown in FIGS. 8A to 8C, proposes the use of a tire-mounted unit 50 comprising a resistance means 51, which has a plurality of resistors 51a, each being a conductive rubber member, and a resistive element 51b connected in parallel with the resistors 51a, a sensor 53, which is provided with a DC power supply 52 connected in series with the resistance means 51, and a transmitter 55, which transmits detection signals of the sensor 53 through an antenna 54. The tire-mounted unit 50 is embedded in a block 61 of a tire tread 60, and the amount of wear of the tire tread 60 is estimated by detecting the resistance value of the resistance means 51 which changes with the wear of the block 60. (Refer to Patent Document 1, for example).

Patent Document 1: Japanese Unexamined Patent Application Publication No. 2005-28950

DISCLOSURE OF THE INVENTION

Problems to be Solved by the Invention

However, the method as described above requires embedding a tire-mounted unit 50, which is provided with a transmitter 55 having an antenna 54, in a block 61 of the tire tread 60, such that it presents not only the problem of troublesome fabrication but also the problem of ensuring durability of the sensor 53 which is exposed in the contact patch.

The present invention has been made in view of these conventional problems, and an object thereof is to provide a method and apparatus for detecting the state of wear of the tire tread with great accuracy while ensuring an excellent durability.

Means for Solving the Problems

Through careful investigations, the inventor has realized that the rigidity of a tread block rises substantially with the progress of tire wear and as a result, the vibration of the block becomes larger when it engages with the road surface and smaller when it disengages therefrom. And he found out that if the magnitude of acceleration of the inner surface of the tread caused by the vibration of the block is detected, the state of tire wear can be detected with excellent accuracy without installing the sensor in the tire tread, and this led to the present invention.

Thus, according to a first aspect of the present invention, there is provided a method for detecting the wear of a tire, comprising the steps of detecting an acceleration waveform of the inner surface of the tread and detecting the state of tire wear from an acceleration waveform in one or both of the leading edge region around a peak position appearing near the leading block point and the trailing edge region around a peak position appearing near the trailing block point of the detected acceleration waveform.

According to a second aspect of the present invention, there is provided a method for detecting the wear of a tire, wherein the lengths of the leading edge region and the trailing edge region are each set based on the time interval between the peak position appearing near the leading block point and the peak position appearing near the trailing block point.

According to a third aspect of the present invention, there is provided a method for detecting the wear of a tire, wherein the lengths of the leading edge region and the trailing edge region are each set according to the wheel speed.

According to a fourth aspect of the present invention, there is provided a method for detecting the wear of a tire, wherein a frequency band value, which is the magnitude of acceleration in a predetermined frequency band of the acceleration waveform in one or both of the leading edge region and the trailing edge region is calculated and the state of tire wear is detected based on the calculated frequency band value.

According to a fifth aspect of the present invention, there is provided a method for detecting the wear of a tire, wherein the predetermined frequency band is changed according to the type of tire.

According to a sixth aspect of the present invention, there is provided a method for detecting the wear of a tire, wherein a plurality of predetermined frequency bands are used and the state of tire wear is detected based on an operation value calculated using a plurality of frequency band values calculated for the respective frequency bands.

According to a seventh aspect of the present invention, there is provided a method for detecting the wear of a tire, wherein the progress of wear is detected when the frequency band value or the operation value exceeds a predetermined threshold.

According to an eighth aspect of the present invention, there is provided a method for detecting the wear of a tire, wherein the threshold is changed according to the wheel speed.

According to a ninth aspect of the present invention, there is provided a method for detecting the wear of a tire, wherein the threshold is changed according to the type of tire or the internal pressure of the tire.

According to a tenth aspect of the present invention, there is provided an apparatus for detecting the wear of a tire, comprising an acceleration sensor for detecting the acceleration of the inner surface of the tread, an acceleration waveform extracting means for extracting an acceleration waveform in the leading edge region around a peak position appearing near the leading block point and an acceleration waveform in the trailing edge region around a peak position appearing near the trailing block point from the time series waveform of the detected acceleration, a band value calculating means for calculating a frequency band value, which is the magnitude of acceleration in a predetermined frequency band of acceleration waveform, in one or both of the acceleration waveforms in the leading edge region and the trailing edge region extracted by the acceleration waveform extracting means and a wear determining means for determining whether tire wear has progressed based on the calculated band value.

ADVANTAGEOUS EFFECT OF THE INVENTION

According to the present invention, an acceleration waveform of the inner surface of the tread is detected, and the state of tire wear is detected from the acceleration waveform in one or both of the leading edge region and the trailing edge region extracted from the detected acceleration waveform. Therefore the state of tire wear can be detected with great accuracy without installing a sensor in the tire tread.

In doing so, the lengths of the leading edge region and the trailing edge region are each set based on the time interval between the peak position appearing near the leading block point and the peak position appearing near the trailing block point. Thus the length of the region from which an acceleration waveform is to be extracted can be set appropriately such that the state of tire wear can be detected with excellent efficiency. Also, by setting the length of the region according to the wheel speed, the length of the region from which the acceleration waveform is to be extracted can be set even more appropriately.

Also, since the magnitude of vibration of the block shows a frequency dependence, a frequency band value, which is the magnitude of acceleration in a predetermined frequency band of the acceleration waveform, in one or both of the leading edge region and the trailing edge region is calculated and the state of tire wear is detected based on the calculated frequency band value. Thus the state of tire wear can be detected with even greater accuracy. In such an arrangement, a plurality of predetermined frequency bands are used and the state of tire wear is detected based on the operation value calculated using a plurality of frequency band values calculated for the respective frequency bands. Then the accuracy of detection can be enhanced further.

Moreover, the progress of wear can be detected when the frequency band value or the operation value has exceeded a predetermined threshold. Thus the running safety of a vehicle may be improved because it is not only possible to warn the driver of such tire condition by an alarm means or the like before his tires become unfit for use but also it is possible to help him take a corrective action and prevent hydroplaning due to insufficient groove depth. In doing so, changing the threshold according to the type of tire and the wheel speed will allow the determination the progress of wear even more appropriately.

1 tire
2 inner liner region
3 tire tread
4 block
5 wheel
10 tire wear detecting apparatus
11 acceleration sensor
11F transmitter
12 wheel speed sensor
13 extracting region setting means
14 acceleration waveform extracting means
15 band value calculating means
16 threshold setting means
17 wear determining means
18 alarm means
19 calculating section

BEST MODE FOR CARRYING OUT THE INVENTION

Preferred embodiments of the present invention will be described hereinbelow with reference to the accompanying drawings.

Figure 1:
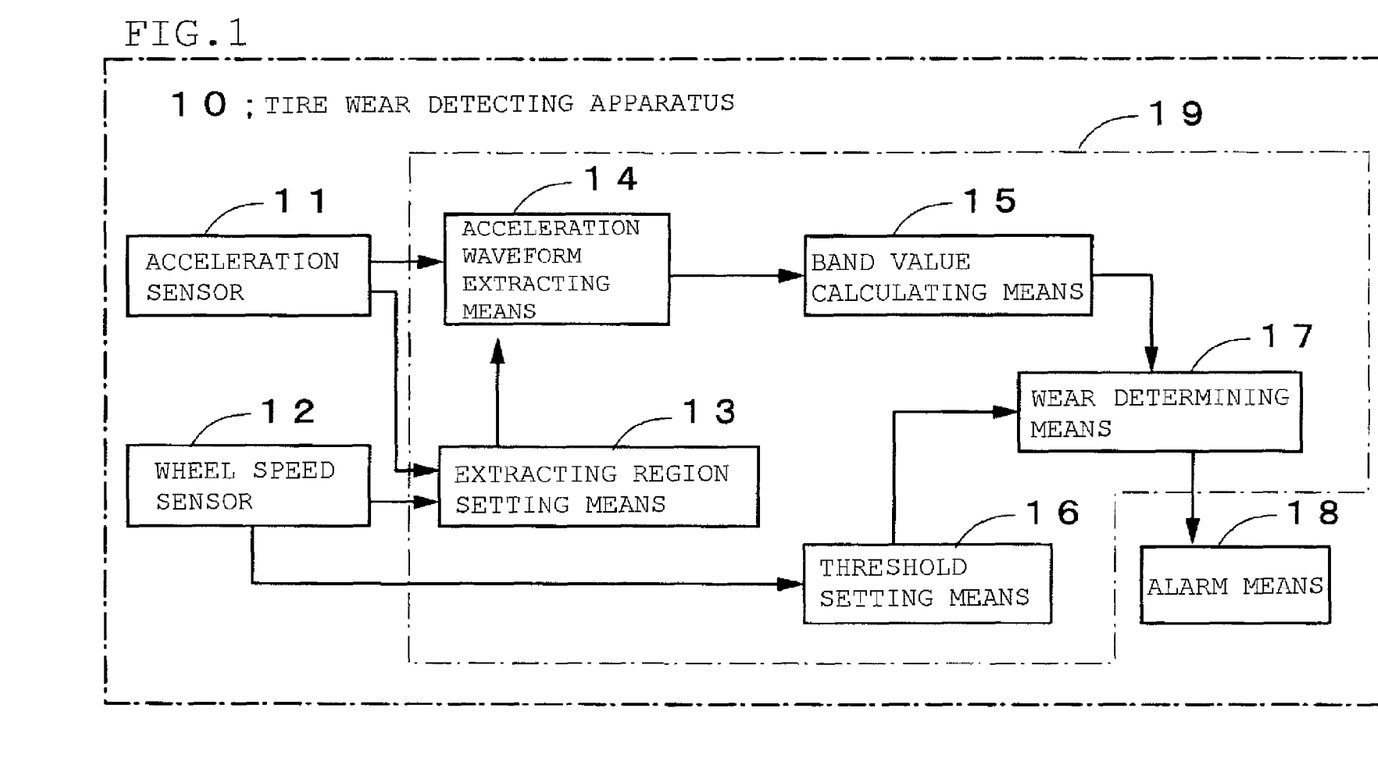
FIG. 1 is a functional block diagram showing a structure of a tire wear detecting apparatus 10 according to a preferred embodiment of the present invention.

FIG. 1 is a functional block diagram showing a structure of a tire wear detecting apparatus 10 according to a preferred embodiment of the present invention. In the figure, reference numeral 11 denotes an acceleration sensor for detecting an acceleration of the inner surface of the tire tread, 12 a wheel speed sensor for detecting the rotational speed of a wheel, 13 an extracting region setting means for calculating a time interval between peak positions by detecting the peak position appearing near the leading block point and the peak position appearing near the trailing block point of the acceleration waveform detected by the acceleration sensor and determining the length of the leading edge region of the acceleration waveform based on the wheel speed detected by the wheel speed sensor 12 and the time interval, 14 an acceleration waveform extracting means for extracting an acceleration waveform in the leading edge region set by the extracting region setting means 13 from the acceleration waveform, 15 a band value calculating means for calculating a frequency band value, which is the magnitude of acceleration in a predetermined frequency band, from the acceleration waveform in the leading edge region extracted by the acceleration waveform extracting means, 16 a threshold setting means for setting a threshold of the frequency band value for determining the progress of tire wear based on the wheel speed detected by the wheel speed sensor 12, 17 a wear determining means for determining whether tire wear has progressed or not by comparing the frequency band value calculated by the band value calculating means 15 with the threshold set by the threshold setting means 16, and 18 an alarm means for giving an alarm about the progress of tire wear based on the result of wear progress determination by the wear determining means 17.

Figure 2:
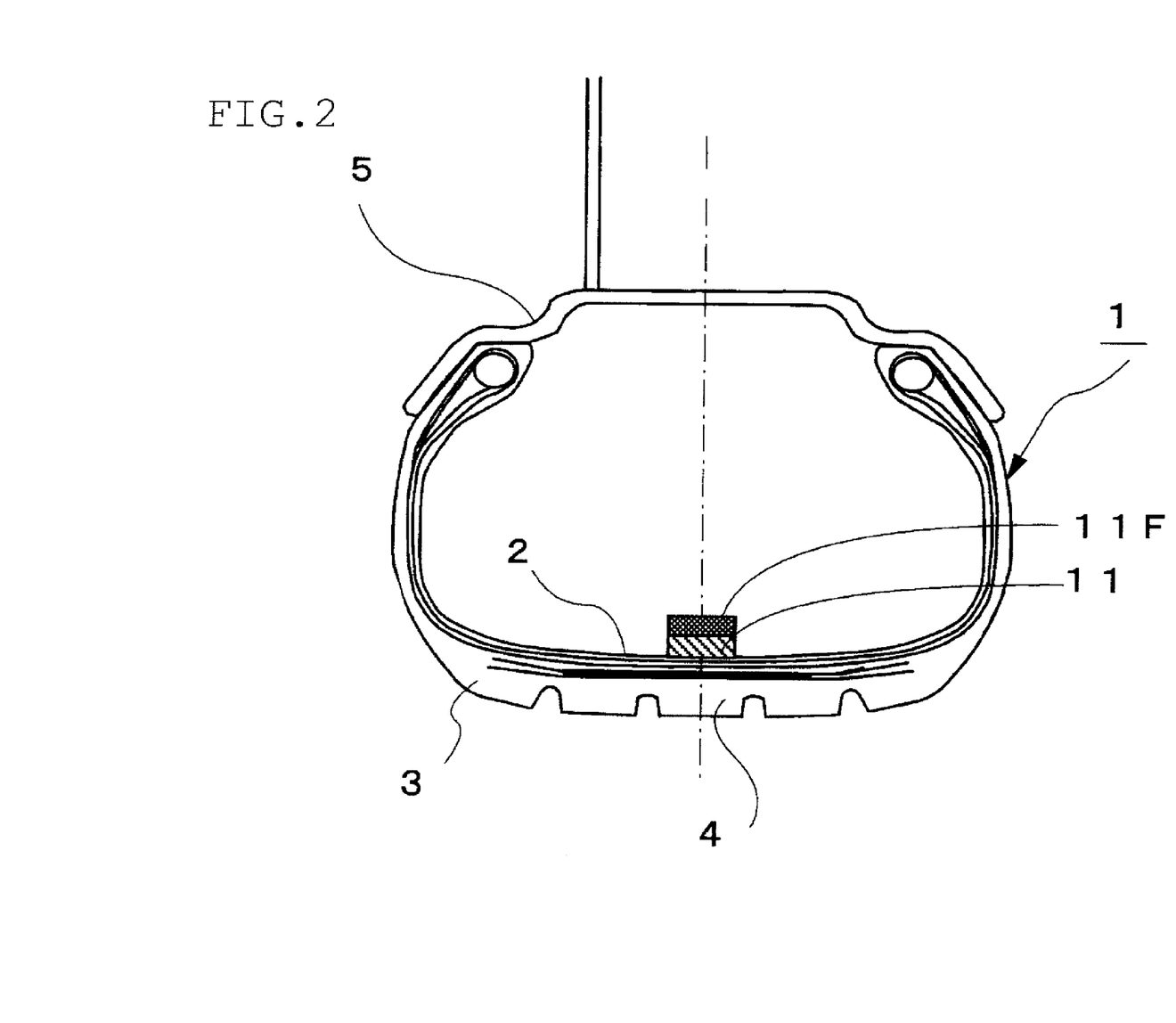
FIG. 2 is an illustration showing an example of installation of an acceleration sensor.

In the present embodiment, as shown in FIG. 2, an acceleration sensor 11 is placed in a position of the inner liner region 2 of a tire 1, corresponding to a block 4 in the middle part of the contact patch of the tire tread 3, and an acceleration waveform of the inner surface of the tire tread 3 caused by the vibration inputted to the block 4 from the road surface is detected. In this embodiment, the acceleration of the inner surface of the tread in the circumferential direction of the tire is detected by placing the acceleration sensor 11 in such a way that detection can be made in the circumferential direction of the tire.

The wheel speed sensor 12 used is a wheel speed sensor of a well-known electromagnetic induction type which has a sensor section, consisting of a yoke and a coil, mounted on a not-shown knuckle to detect the rotation of the wheel axle.

Also, the component means from the extracting region setting means 13 to the wear determining means 17 constitute a calculating section 19 which is installed on the vehicle body, and the alarm means 18 is installed near the driver's seat.

As an arrangement for sending output signals of the acceleration sensor 11 to the calculating section 19, it is preferable that a transmitter 11F is installed in the inner liner region 2 or on a wheel 5 as shown in FIG. 2, for instance, and the output signals, after they are amplified by a not-shown amplifier, are transmitted to the calculating section 19 wirelessly. The arrangement may also be such that the calculating section 19 is installed on the tire and the results of determination by the wear determining means 17 are transmitted to the alarm means 18.

Now a tire wear detecting method according to the preferred embodiment will be explained.

First, the acceleration of the inner surface of the tire tread is detected by the acceleration sensor, and a time-series waveform of this acceleration (hereinafter referred to as acceleration waveform) is sent to the extracting region setting means 13.

Figure 3:
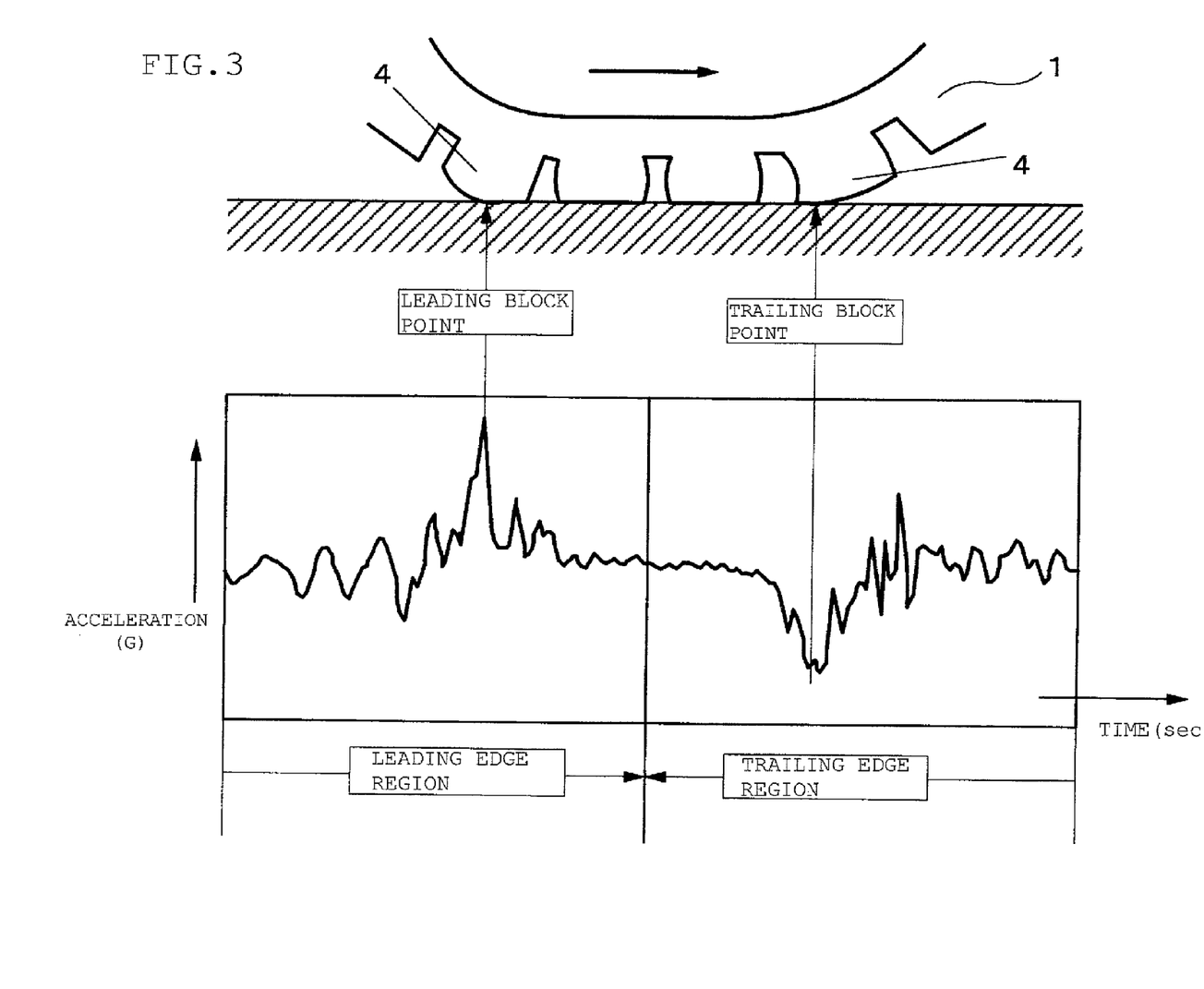
FIG. 3 is a diagram showing an acceleration waveform of the inner surface of a tire tread.

FIG. 3 is a diagram showing an example of an acceleration waveform as mentioned above. The block 4 formed on the surface of the tire tread is subjected to strong vibrations when it engages with the road surface (at the leading edge) and when it disengages from it (at the trailing edge). These vibrations can be detected as acceleration of the inner liner region 2 by the acceleration sensor, and the acceleration waveform shows a prominent peak when the block 4 is positioned near the leading block point, which corresponds to the position of engagement with the road surface, and another near the trailing block point, which corresponds to the position of disengagement from the road surface. The extracting region setting means 13 determines the length $\Delta L(m)$ of the leading edge region by calculating the time interval $T(sec)$ between the peak position appearing near the leading block point and the peak position appearing near the trailing block point. More specifically, time $T_m$ at the middle point between the leading block point and the trailing block point is determined from the time interval $T(sec)$, and the time region ($[T_m-T]\sim[T_m]$) starting $T(sec)$ before time $T_m$ and ending at time $T_m$ at the middle point is considered as the time length $\Delta T(sec)$ of the leading edge region. Accordingly, the leading edge region is a region covering ($\Delta T/2$) before and after the point of time when the leading point peak appears. At this time, the time interval $T(sec)$ and the time length $\Delta T(sec)$ of the leading edge region are converted into the distance $L(m)$, which is the contact length of the tire, and the length $\Delta L(m)$ of the leading edge region, respectively, using the wheel speed V detected by the wheel speed sensor 12. In this manner, if the length of the leading edge region is expressed as a distance using the wheel speed V, then it is possible to find the magnitude of acceleration of the inner liner region 2 corresponding to the position of the block 4 relative to the road surface, which allows the grasp of the behavior of the block 4.

Next, the acceleration waveform extracting means 14 extracts the acceleration waveform to be used in analyzing the state of tire wear, which is the acceleration waveform in the leading edge region set by the extracting region setting means 13.

The acceleration waveform in the leading edge region extracted by the acceleration waveform extracting means 14 is sent to the band value calculating means 15, and the band value calculating means 15 calculates a frequency band value, which is the magnitude of acceleration in the predetermined frequency band.

Figure 4:
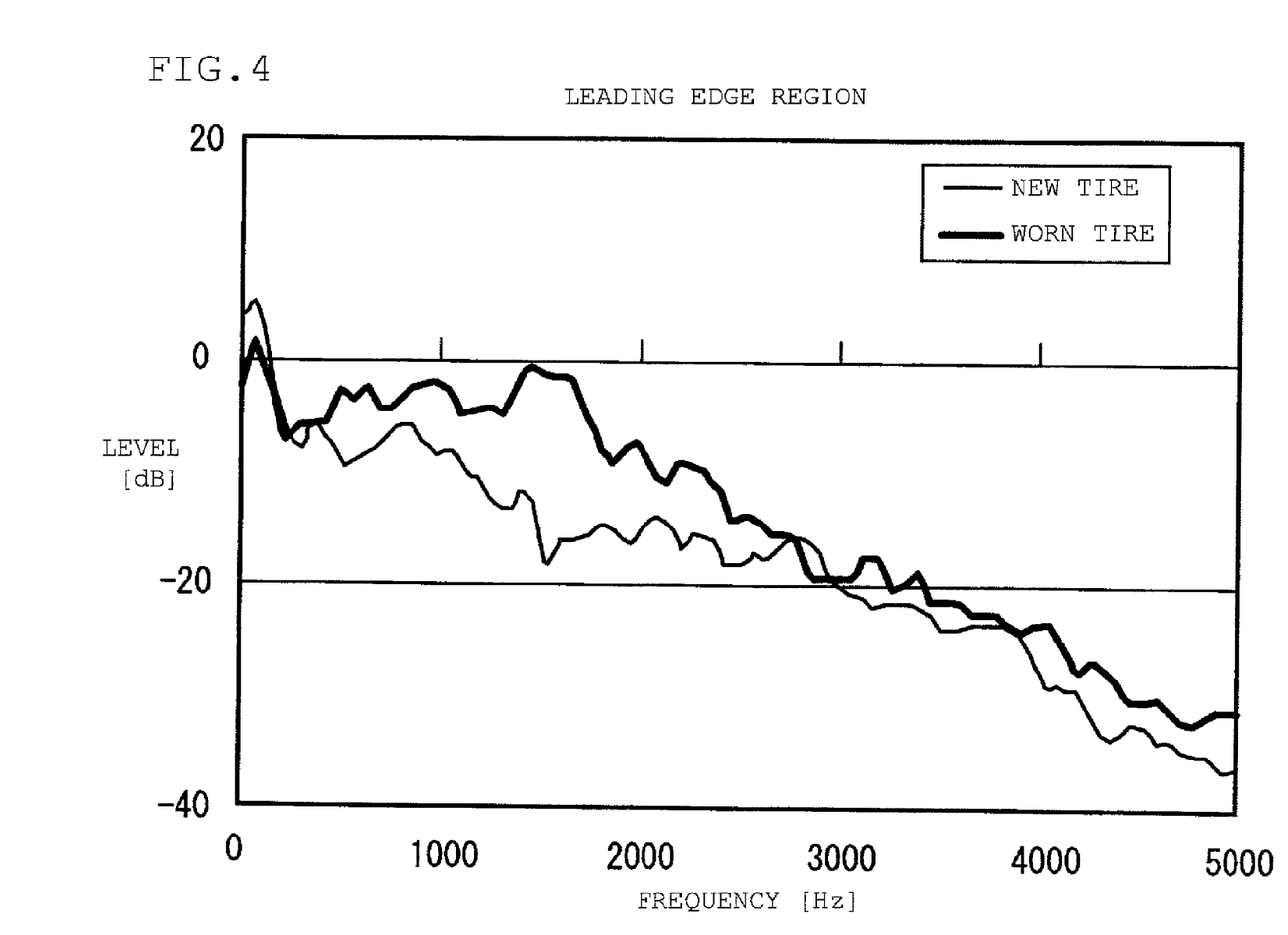
FIG. 4 is a diagram showing examples of frequency spectra of the acceleration waveforms in the leading edge region of a new tire and a worn tire.

FIG. 4 is a diagram showing examples of frequency spectra obtained through frequency analysis of the acceleration waveforms in their respective leading edge regions of a new tire and a worn tire. In the figure, the thick solid line represents the frequency spectrum when the tire fitted is a worn tire, and the thin solid line the frequency spectrum when the tire fitted is a new tire (with no wear). Note that the tires used in the testing were 225/55R17, and the vehicle speed used was 30 km/h.

As the tire wears, the block height reduces and along with it the rigidity of the block rises substantially. As a result, the shock the block receives as it engages with the road surface becomes larger, and accordingly the magnitude of acceleration in the leading edge region becomes larger. In this example, the acceleration shows a conspicuous increase in the region of 1 kHz to 3 kHz. The band value calculating means 15 calculates the magnitude of acceleration in the frequency band of 1 kHz to 3 kHz from the frequency spectrum and sends it as the frequency band value $P_f$ to the wear determining means 17.

Figure 5:
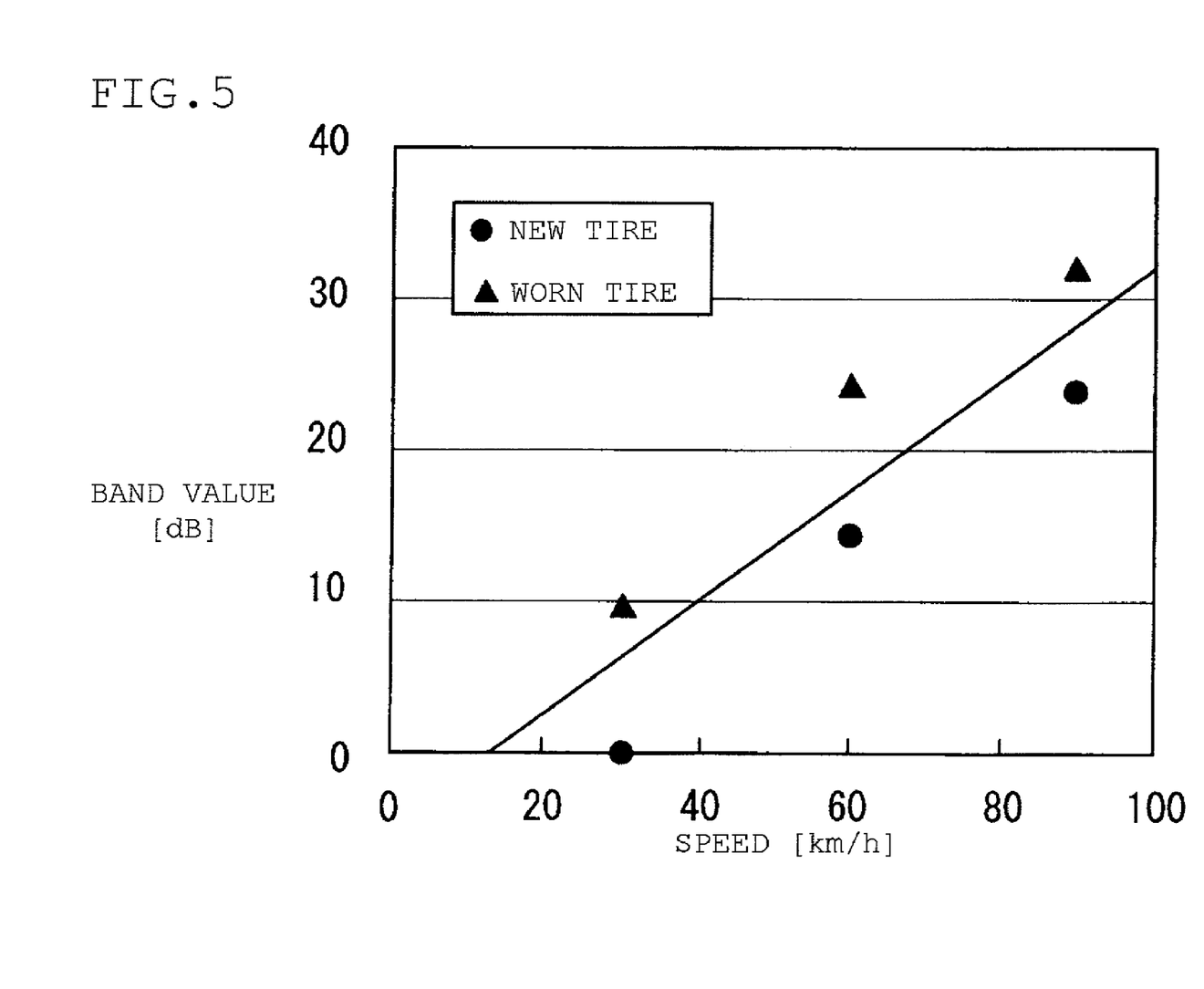
FIG. 5 is a graph showing a relationship between the frequency band value and the wheel speed.

It is known that the higher the wheel speed is, the larger the frequency band value in the leading edge region will be. FIG. 5 is a graph showing the results of obtaining the frequency band value $P_f$ (dB) in the region of 1 kHz to 3 kHz from the frequency spectrum by performing a frequency analysis, in which a vehicle was run on a smooth asphalt road at 30, 60, and 90 km/h and the accelerations of the inner surface of the tire tread were measured. In the graph, the ● marks indicate the frequency band values when the vehicle has new tires (with no wear) on, and the ▲ marks the frequency band values when the vehicle has worn tires on. The tire used in the testing was 225/55R17.

Now the threshold setting means 16 sets the threshold $K(v)$ dependent on the wheel speed, which is the threshold of the frequency band value for determining the progress of tire wear, shown by a straight line in the graph, based on the wheel speed detected by the wheel speed sensor 12, and sends it to the wear determining means 17.

The wear determining means 17 determines the degree of tire wear by comparing the frequency band value $P_f$ with the threshold $K(v)$. And when the frequency band value $P_f$ is in excess of the threshold $K(v)$, the wear determining means 17 determines that the wear of the tire has progressed and inputs the signal to the alarm means 18, which warns the driver of the progress of tire wear by flashing an alarm LED or the like.

As tire wear progresses, the groove depth becomes insufficient, which causes hydroplaning more readily even when there is only a small depth of water. Therefore, the driver should be warned of such tire condition by an alarm means 18 before his tires become unfit for use. Then the driver may take a corrective action such as replacing the tires, and that will enhance vehicular safety.

According to this preferred embodiment as described above, an acceleration sensor 11 is installed in the inner liner region 2 of a tire 1, and the acceleration of the inner surface of the tire tread is detected. At the same time, an acceleration waveform in the leading edge region, which includes a leading point peak occurring as the block 4 engages with the road surface, is extracted from the time-series waveform of the detected acceleration, and a frequency band value $P_f$, which is the magnitude of acceleration in a predetermined frequency region of the frequency spectrum obtained through a frequency analysis of the extracted acceleration waveform in the leading edge region, is obtained. Then the frequency band value $P_f$ is compared with the threshold K(v), which is set beforehand, to determine the degree of tire wear. Consequently, it is possible to detect the state of tire wear with excellent accuracy without installing a sensor in the tread surface of the tire.

In the preferred embodiment, the circumferential acceleration of the inner surface of the tread is detected by placing the acceleration sensor 11 in such a manner as to enable detection in the circumferential direction of the tire. However, a similar effect can be achieved by an arrangement in which the acceleration sensor 11 is placed in such a position as to enable detection in the axial (tire width) or radial (tire radius) direction of the tire, so that the frequency band value is obtained by detecting the axial or radial acceleration of the inner surface of the tread.

Also, in the present embodiment, the state of tire wear is detected using the acceleration waveform in the leading edge region. However, the acceleration waveform in the trailing edge region may be used instead. The trailing edge region may be determined to be the time region ($[T_m]\sim[T_m+T]$) starting at time $T_m$ at the middle point, which is derived from the time interval T(sec) between the peak position appearing near the leading block point and the peak position appearing near the trailing block point, and ending above-mentioned T(sec) thereafter.

Figure 6:
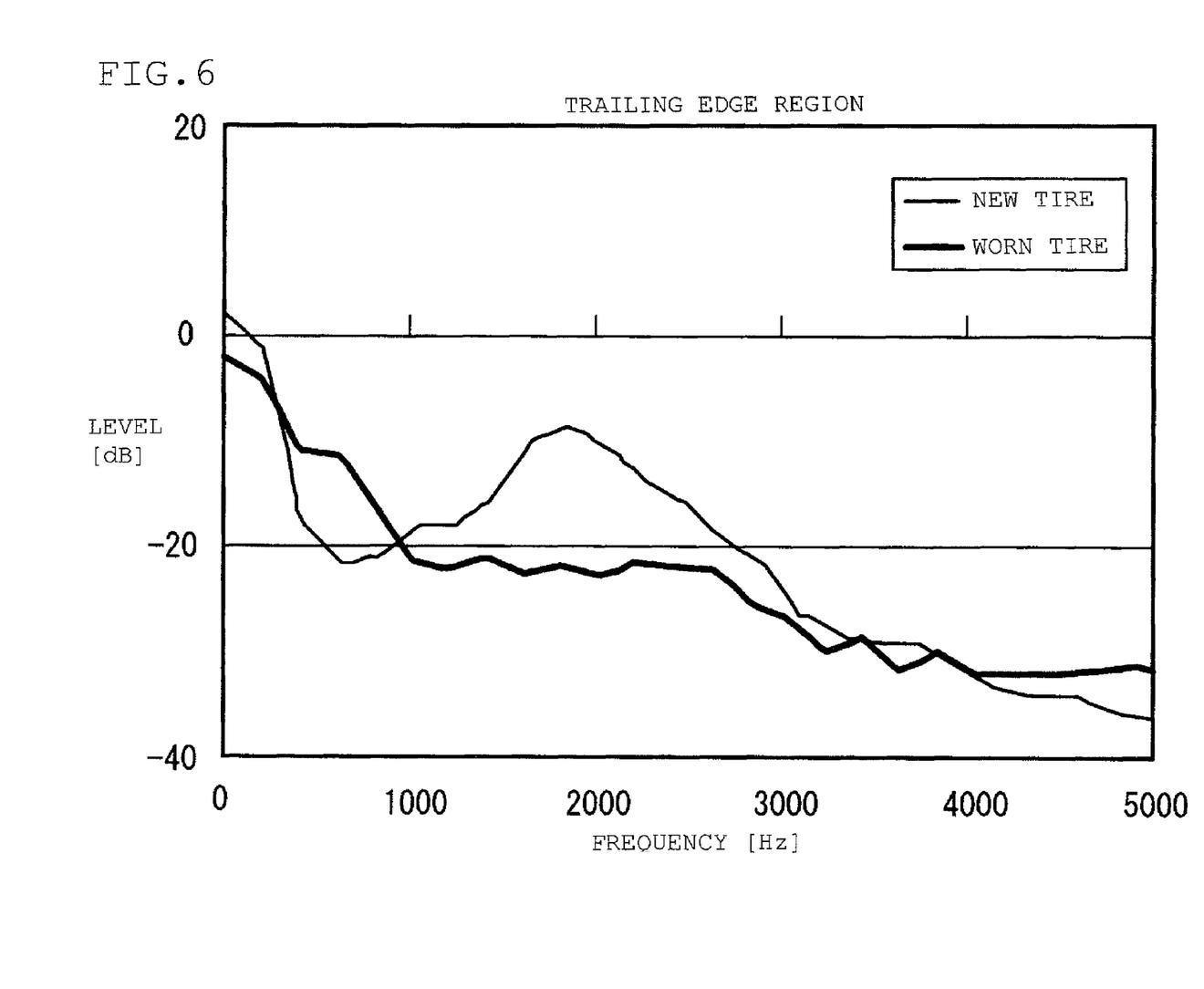
FIG. 6 is a diagram showing examples of frequency spectra of the acceleration waveforms in the trailing edge region of a new tire and a worn tire.

FIG. 6 is a diagram showing examples of frequency spectra obtained through frequency analysis of the acceleration waveforms in their respective trailing edge regions of a new tire and a worn tire. In the figure, the thick solid line represents the frequency spectrum when the tire fitted is a worn tire, and the thin solid line the frequency spectrum when the tire fitted is a new tire (with no wear).

As the tire wears and the rigidity of the block rises substantially, the vibration of the block as it disengages from the road surface becomes smaller. Accordingly, the magnitude of acceleration in the trailing edge region becomes smaller contrary to the case in the leading edge region. In this example, the acceleration shows a conspicuous decrease in the region of 1 kHz to 3 kHz. Hence, the band value calculating means 15 may calculate the magnitude of acceleration in the frequency band of 1 kHz to 3 kHz from the frequency spectrum, and this operation value may be used as the frequency band value $P_k$ in determining the state of tire wear. Also, it goes without saying that when the frequency band value $P_k$ in the trailing edge region is used, the threshold K(v) to be used in determining the state of wear must also be changed.

Also, if both of the frequency band value $P_f$ in the leading edge region and the frequency band value $P_k$ in the trailing edge region are used in determining the state of wear, the accuracy of determination can be further improved.

Figure 7:
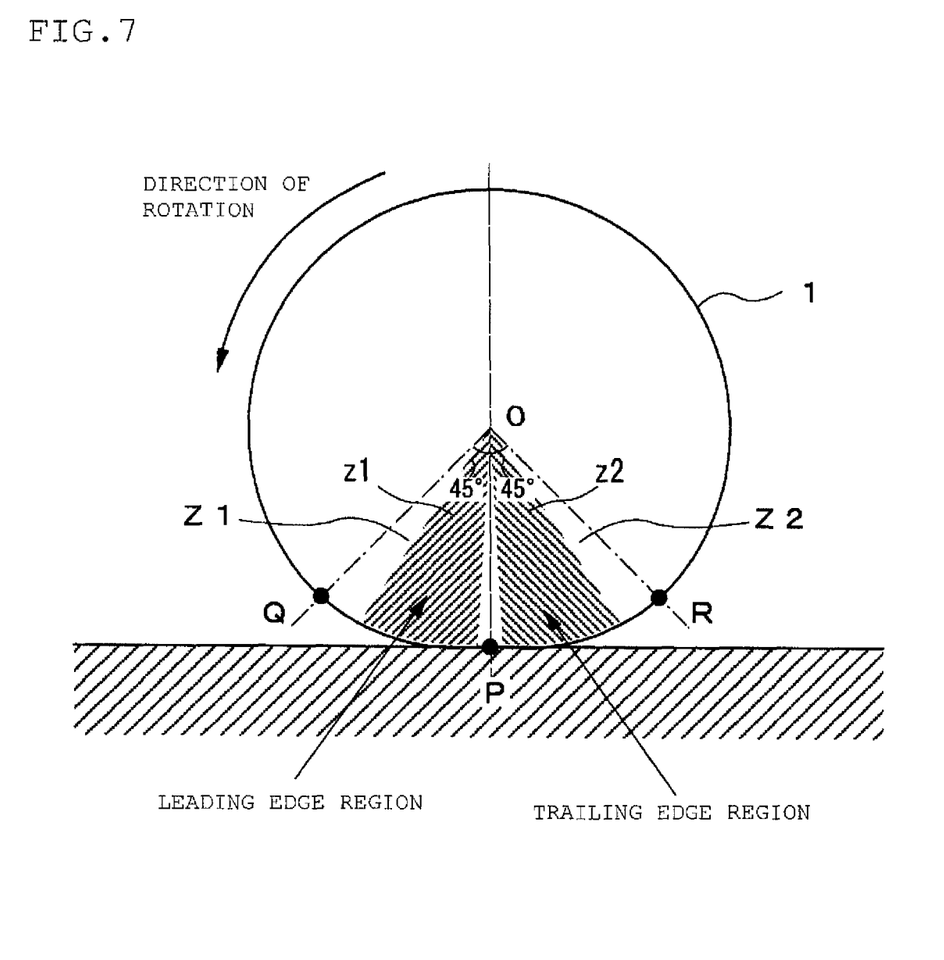
FIG. 7 is an illustration showing how to set the leading edge region, the trailing edge region, etc.

Also, in this embodiment, the time region ($[T_m-T]\sim[T_m]$) is the leading edge region. However, the arrangement is not limited thereto, but may be such that it is, for instance, the region from the leading peak position to the center position of the contact patch. Also, it is not necessary that the peak position is in the center of the leading edge region. Also, the leading edge region may be a region on the circumference of the tire, not a time region. More specifically, as shown in FIG. 7, when P is the center position of the contact patch of a tire 1, O is the center of the tire, and ∠POQ is 45°, the region z1, which is selectable from the region Z1 between the point Q in the traveling direction and the center position P of the contact patch, may be used as the leading edge region. In doing so, it will be simpler if the length of the leading edge region z1 is expressed in terms of an angle of rotation, such as an equivalent length of 30°, for instance. And it is to be noted that the lengths or the rotation angles of the regions Z1 and z1 are calculated using the diameter of the tire and the wheel speed V.

The same applies to the trailing edge region as well. In this case, too, as shown in FIG. 7, the region z2, which is selectable from the region Z2 between P, the center position of the contact patch of tire 1, and R, the point 45 degrees from P in the direction opposite to traveling, may be used as the trailing edge region.

Also, in this embodiment, the frequency band value $P_f$, which is the magnitude of acceleration in the region of 1 kHz to 3 kHz, is obtained from the frequency spectrum derived through frequency analysis of an acceleration waveform. However, the arrangement may be such that the frequency band value $P_f$ is obtained using a band pass filter whose passband is 1 to 3 kHz. It should be noted that the state of tire wear can be detected with even greater accuracy if the frequency band to be extracted is changed according to the type or size of tire, wheel speed, internal pressure data, and the like.

Also, in this embodiment, a band value calculating means 15 is installed to obtain a frequency spectrum of fore-aft acceleration of the inner surface of the tread, and the band value of the fore-aft acceleration of the inner surface of the tread is calculated from the frequency spectrum. However, it is not absolutely necessary to obtain a frequency spectrum in order to calculate the band value. Rather, it may be possible to obtain the band value by extracting a fore-aft acceleration component in the frequency band set according to the wheel speed by the use of a band pass filter.

Also, the frequency band to be extracted is not limited to one, but frequency band values of a plurality of frequency bands may be used. And in determining the state of wear, an operation value derived from the frequency band values, such as an average value of the frequency band values of the frequency bands, may be used.

Also, in this embodiment, a frequency band value $P_f$ of the frequency spectrum of an acceleration waveform is obtained, and the frequency band value $P_f$ is compared with a threshold K(v) set in advance. Instead, the arrangement may be such that the frequency band value $P_0$ of a new tire is determined beforehand, and when the frequency band value $P_f$ obtained actually has exceeded the frequency band value $P_0$ by more than a predetermined value, it is determined that tire wear has progressed.

INDUSTRIAL APPLICABILITY

As described above, the tire wear detecting apparatus according to the present invention not only excels in durability but also can detect the state of tire wear with great accuracy. And the running safety of a vehicle can be enhanced by providing an alarm means or the like that can warn the driver of the state of tire wear.

The invention claimed is:
1. A method for detecting the wear of a tire, comprising the steps of:
    detecting an acceleration waveform of the inner surface of the tread; and
    detecting the state of tire wear from an acceleration waveform in one or both of the leading edge region around a peak position appearing near the leading block point and the trailing edge region around a peak position appearing near the trailing block point of the detected acceleration waveform.

2. The method for detecting the wear of a tire according to claim 1, wherein the lengths of the leading edge region and the trailing edge region are each set based on the time interval between the peak position appearing near the leading block point and the peak position appearing near the trailing block point.

3. The method for detecting the wear of a tire according to claim 1, wherein the lengths of the leading edge region and the trailing edge region are each set according to the wheel speed.

4. The method for detecting the wear of a tire according to claim 1, wherein a frequency band value, which is the magnitude of acceleration in a predetermined frequency band of the acceleration waveform in one or both of the leading edge region and the trailing edge region is calculated and the state of tire wear is detected based on the calculated frequency band value.

5. The method for detecting the wear of a tire according to claim 4, wherein the predetermined frequency band is changed according to the type of tire.

6. The method for detecting the wear of a tire according to claim 4, wherein a plurality of predetermined frequency bands are used and the state of tire wear is detected based on an operation value calculated using a plurality of frequency band values calculated for the respective frequency bands.

7. The method for detecting the wear of a tire according to claim 4, wherein the progress of wear is detected when the frequency band value or the operation values exceeds a predetermined threshold.

8. The method for detecting the wear of a tire according to claim 7, wherein the threshold is changed according to the wheel speed.

9. The method for detecting the wear of a tire according to claim 7, wherein the threshold is changed according to the type of tire or the internal pressure of the tire.

10. An apparatus for detecting the wear of a tire, comprising:
an acceleration sensor for detecting the acceleration of the inner surface of the tread;
an acceleration waveform extracting means for extracting an acceleration waveform in the leading edge region around a peak position appearing near the leading block point and an acceleration waveform in the trailing edge region around a peak position appearing near the trailing block point from the time series waveform of the detected acceleration;
a band value calculating means for calculating a frequency band value, which is the magnitude of acceleration in a predetermined frequency band of acceleration waveform, in one or both of the acceleration waveforms in the leading edge region and the trailing edge region extracted by the acceleration waveform extracting means; and
a wear determining means for determining whether tire wear has progressed based on the calculated band value.

* * * * *